July 6, 1965 H. H. SEWARD 3,193,744

OPTICAL SYNCHRO SYSTEM

Original Filed April 29, 1958 5 Sheets-Sheet 1

INVENTOR.
HAROLD H.SEWARD
BY
Wangarten, Ornbach & Pandiscio
ATTORNEY

INVENTOR.
HAROLD H. SEWARD
BY
Weingarten, Orenbuch & Pandiscio
ATTORNEY

July 6, 1965 H. H. SEWARD 3,193,744

OPTICAL SYNCHRO SYSTEM

Original Filed April 29, 1958 5 Sheets-Sheet 3

INVENTOR.
HAROLD H. SEWARD
BY
Weingarten, Oranbuck & Pandiscio
ATTORNEY

INVENTOR.
HAROLD H. SEWARD
BY
Weingarten, Orenbuch & Pandiscio
ATTORNEY

July 6, 1965 H. H. SEWARD 3,193,744

OPTICAL SYNCHRO SYSTEM

Original Filed April 29, 1958 5 Sheets-Sheet 5

INVENTOR.
HAROLD H. SEWARD
BY
Weingarten, Orenbuch & Pandiscio
ATTORNEY 3,193,744
OPTICAL SYNCHRO SYSTEM
Harold H. Seward, Burlington, Mass.
(16 Frost St., Arlington, Mass.)
Original application Apr. 29, 1958, Ser. No. 731,844, now Patent No. 3,096,444, dated July 2, 1963. Divided and this application Oct. 10, 1962, Ser. No. 229,627
8 Claims. (Cl. 318—18)

This is a division of my copending application Serial No. 731,844, filed April 29, 1958, for "Electromechanical Transducing System," now Patent No. 3,096,444, dated July 2, 1963.

The present invention relates in general to electromechanical transducers and more particularly concerns a novel photoelectric shaft-position transducer incorporating a simple optical and electronic system of high accuracy and reliability in a compact, lightweight and inexpensive design. The novel transducer is suitable for providing an analog to digital electrical indication of the angular position or angular velocity of a shaft by means of an electrical output, which, depending upon the choice of input power, may be optionally A.-C. or D.-C.

According to the invention, a generally circular disc having a photographic or etched pattern divided into a relatively large number of alternately opaque and light transmissive (transparent or translucent) equiangular sectors is mounted on a rotatable shaft. A similar circular disc with alternately opaque and transparent equiangular sectors, but having one more opaque and one more transparent sector, is supported parallel and closely adjacent to the other disc about the shaft axis. The centers of both discs are disposed on the axis of shaft rotation. Two photoelectric transducers, such as phototransistors, are located diametrically opposite peripheral portions of one disc and are oriented to receive light from respective light sources transmitted through both discs.

At one point in the circumference of the discs, a minimum of light (substantially zero) will be transmitted to the phototransistors since the opaque sectors of one disc entirely cover the transparent sectors of the other. In the circumferential regions spaced 90° in either direction from the region of minimum light transmission, the transparent sectors are only half covered by opaque sectors. In the circumferential region diametrically opposite the region of minimum light transmission, the transmission of light is a maximum because there the transparent sectors of the disc having the larger number of equiangular sectors are directly opposite the transparent sectors of the other disc.

If one disc is rotated angularly by an amount equal to a sector angle, the diametrically opposite regions where light is minimally and maximally transmitted is reversed, that is, the opaque region and the transparent region each rotate 180°. For a single full rotation of a disc, the dark and light pattern is effectively "geared up" optically to rotate N times, N being the number of opaque lines on the rotating disc. If the other disc is allowed to rotate also, a geared up differential is optically realized. As the pattern rotates, the light transmitted to the phototransistors is correspondingly modulated to produce a characteristic electrical output signal. If the phototransistors are energized in cascode from a D.-C. supply, a triangular potential waveform is developed at the output. By sensing the wavefrom polarity, corresponding binary values may be determined. If the phototransistors are energized from an A.-C. power source, the output waveform is an A.-C. signal of corresponding frequency modulated so that it appears triangular in form. A binary value may be determined by counting the phase reversals of the waveform.

It is a principal object of the invention to provide an electromechanical shaft transducer for accurately generating an electrical signal representative of the angular displacement of a rotatable shaft.

It is another object of the invention to provide an electro-optical transducer for shaft angular position and velocity which inherently permits exceptional accuracy and sensitivity, while being lightweight and compact, highly reliable, and particularly low in cost.

It is another object of the invention to provide a shaft parameter transducer capable of operating at relatively high angular velocities and exhibiting good transient characteristics.

It is another object of the invention to achieve a digital indication of shaft parameters with an electro-optical transducer in accordance with the preceding objects.

Still another object of the invention is to provide an exceptionally accurate tachometer system.

It is still another object of the invention to provide a multiphase synchro system in accordance with the preceding objects.

It is still aonther object of the invention to provide a system incorporating the basic transducer disclosed herein, in which the phototransistors and light sources are maintained in fixed relationship with one of the two discs and while the whole assembly is servoed to rotate in such a manner that the output voltage is nulled, whereby the said assembly rotates N times as fast as the other disc. In accordance with a feature of the invention, a fine-coarse synchro system may be constructed by using an additional track on each disc with a different number of alternately light and dark sectors.

In accordance with the principles of the invention. the preceding objects are achieved without the inertia, friction load, or the mechanical wear of a gear train. Space requirements and mechanical tolerances are minimized while maximizing both operating speed and angular accuracy.

Other features, objects and advantages of the invention will become apparent from the following specification when read in connection with the accompanying drawing in which.

Figure 1:
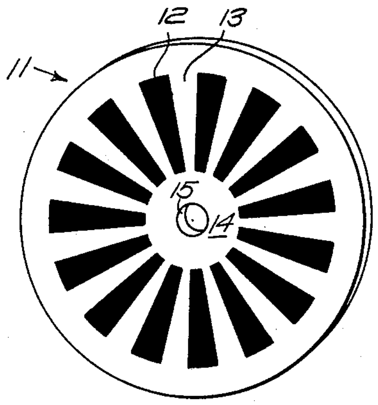
FIG. 1 shows a disc for a transducer of this invention with 15 opaque and 15 transparent sectors.
Figure 2:
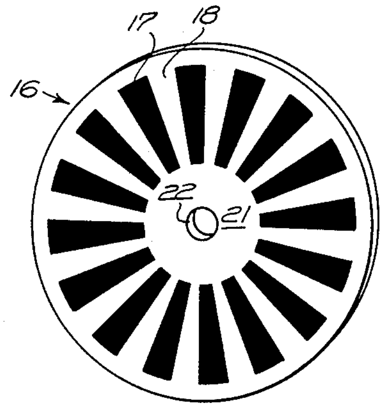
FIG. 2 shows a disc for association in a transducer with the disc of FIG. 1, and having 16 opaque and transparent sectors.
Figure 4:
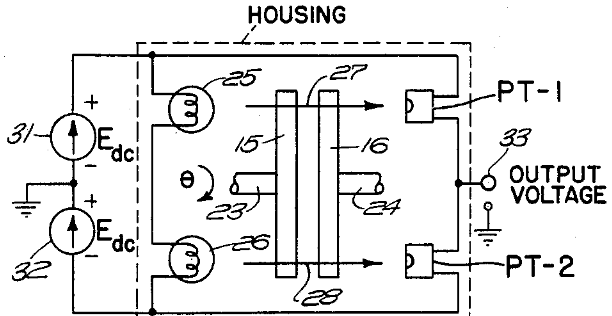
Figure 5A:
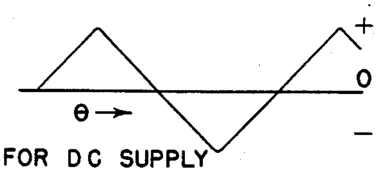
Figure 5B:
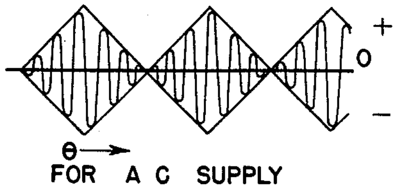
Figure 6:
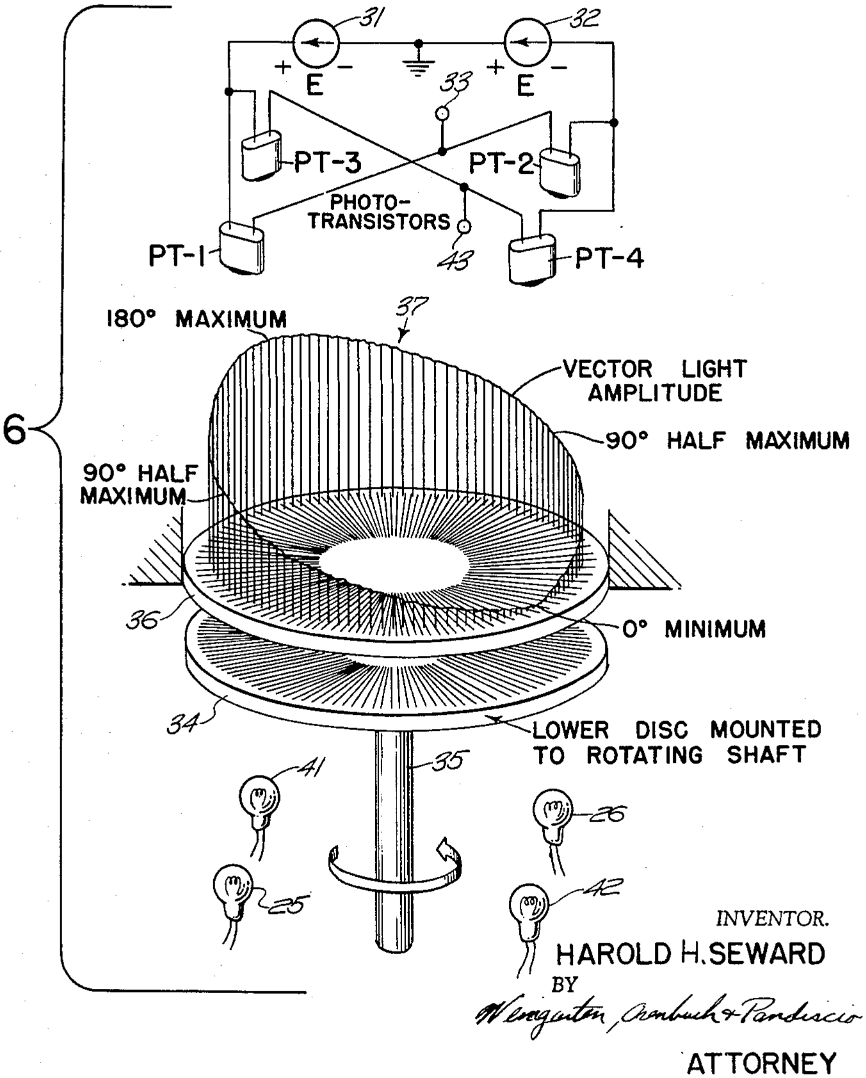
Figure 7:
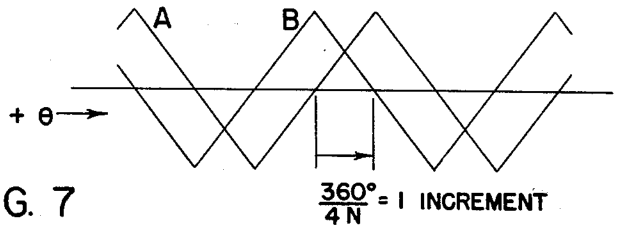
Figure 8:
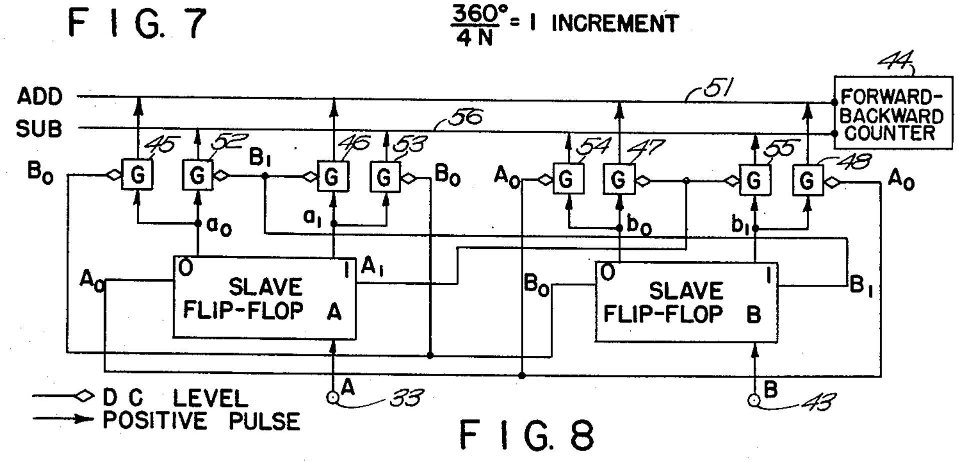
Figure 9:
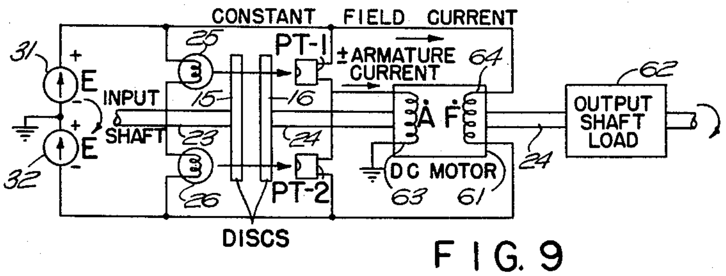
Figures 10, 11:
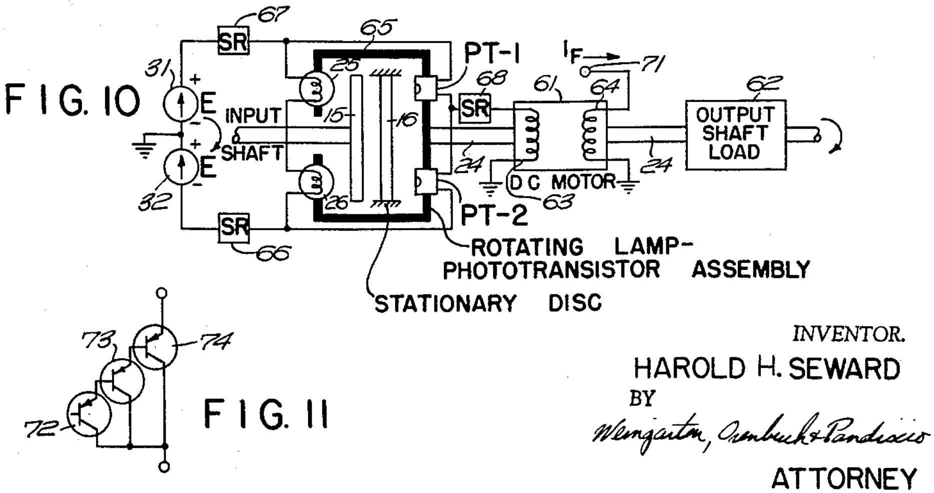
Figure 12:
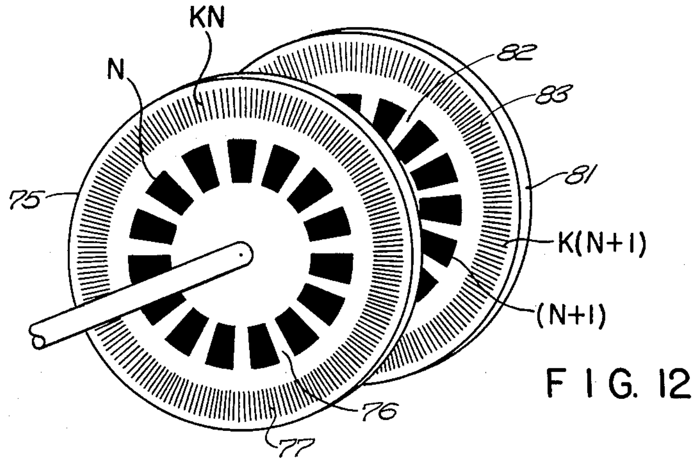
Figure 13:
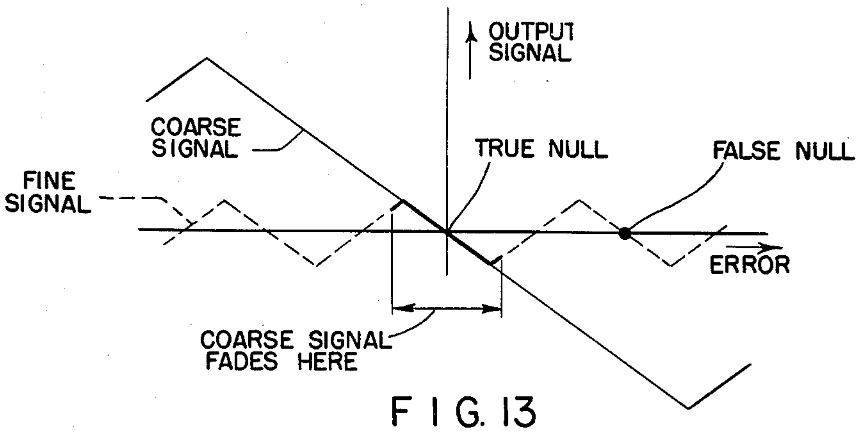
Figure 14:
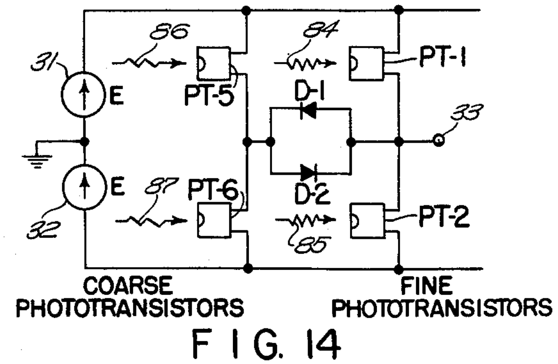
Figure 15:
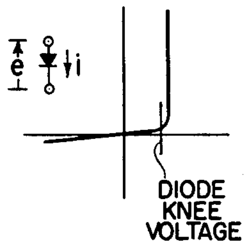
Figure 16:
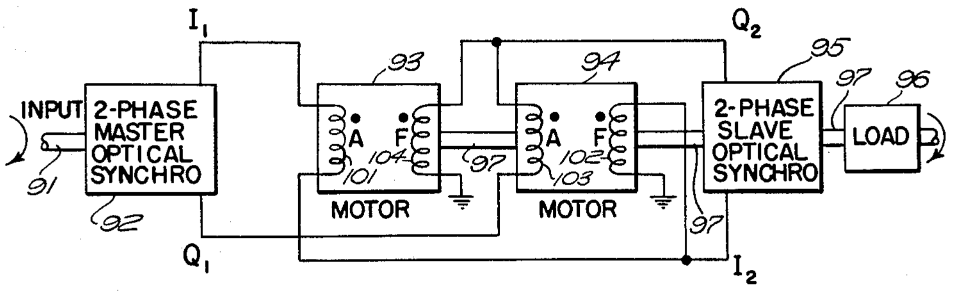

FIG. 4 diagrammatically represents a transducer system according to the invention;

FIGS. 5A and 5B are a graphical representation of signal waveforms derived from the system of FIG. 4;

FIG. 6 is a pictorial representation of a preferred form of the invention having four light sources in space quadrature about the axis of rotation, in which the light transmitted through the respective translucent sectors is vectorially represented;

FIG. 7 shows the time relationship between the signals derived from the two pairs of space quadrature, cascode-connected phototransistors of FIG. 6;

FIG. 8 is a block diagram of apparatus for obtaining a digital indication from the signal waveforms of FIG. 7;

FIG. 9 shows a shaft follower servo incorporating the invention;

FIG. 10 shows an optically geared-up follower servo;

FIG. 11 shows compounded transistors unable to increase power gain;

FIG. 12 shows a pair of discs embodying the basic principles of those shown in FIGS. 1 and 2 but formed with fine and coarse tracks to provide fine and coarse indications;

FIG. 13 graphically represents fine and coarse signals derived from a system using the discs of FIG. 12 to demonstrate how a true null may be identified;

FIG. 14 shows a schematic circuit diagram of a system for detecting the true null shown in FIG. 13;

FIG. 15 represents a typical silicon diode characteristic advantageously applied in the circuit of FIG. 14; and FIG. 16 shows a system for electrically transmitting shaft position with the apparatus of this invention.

In the different figures of the drawing, like elements are designated by the same reference symbols.

With reference now to the drawing, and more particularly FIG. 1 thereof, there is shown a circular disc 11 preferably of thin glass, Lucite or any similar light transmissive base, having fifteen concentric opaque sectors 12 and fifteen transparent sectors 13, each of the sectors being 12° wide. The sector pattern shown may be prepared by photographic or photoengraving processes which permit mass production from a master pattern, if desired. The hub region 14 is represented as being transparent; however, its light transmission characteristics in the present system are unimportant. The central opening 15 provides means for securing disc 11 to a rotatable shaft (not shown).

With reference to FIG. 2, there is shown a circular disc 16 of like diameter and material, and prepared in the same manner, having sixteen opaque sectors, such as sector 17, and sixteen transparent sectors, such as sector 18, each being 11.25° in angular width. Like disc 11, disc 16 has a transparent center 21 and a central opening 22 adapted to permit attachment to a rotatable shaft (not shown).

For clarity, the discs 11 and 16 are shown with only fifteen and sixteen opaque sectors, respectively; however, it is to be understood that discs with any number of alternatingly opaque and transparent equiangular sectors may be constructed according to the invention provided that adjacent discs have a different number of such sectors, the difference preferably being one opaque and one transparent sector.

Figure 3:
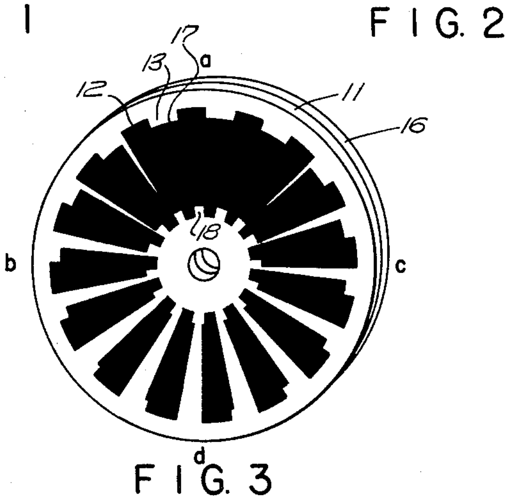
FIG. 3 illustrates the effect when the discs of FIG. 1 and FIG. 2 are mounted coaxially.

With reference to FIG. 3, the discs 11 and 16 are shown mounted parallel to one another with their centers upon a common axis. For clarity in the following, the opaque sectors on one have been shown as slightly offset radially from those of the other. In practice there need be no such difference. It is seen that there is a region *a* around the circumference of the discs where the opaque sectors of each disc cover the transparent sectors of the other disc. A minimum of light (substantially zero), therefore, may be transmitted through this region. At positions *b* and *c*, 90° to either side of region *a*, the transparent sectors are half open, and in region *d*, diametrically opposite region *a*, transparent sectors of both discs coincide and a maximum of incident light may be transmitted therethrough.

If disc 16 is rotated through a sector angle of 11.25°, this dark and light pattern will rotate 180° around the circumference. If disc 16 is angularly displaced again by the same angle, the pattern will have rotated around to its original position. For a full 360° rotation of a disc, the pattern will be optically geared up to rotate N times where N is the number of opaque sectors on the rotating disc. The direction of rotation of the pattern is the same as that of the disc rotation when the rotating disc contains the larger number of sectors. When the disc with a smaller number of sectors is rotated, the sense of the pattern rotation is opposite to that of the disc rotation.

With reference to FIG. 4, there is shown a diagrammatic representation of apparatus for sensing the rotating light pattern achieved by overlaying the discs as shown in FIG. 3. Discs 15 and 16 are illustrated as secured to rotatable shafts 23 and 24, respectively. Light bulbs 25 and 26 respectively transmit light beams 27 and 28 through discs 15 and 16 to diametrically opposite phototransistors PT–1 and PT–2 connected in cascode and energized by potentials from serially connected D.-C. sources such as batteries 31 and 32, the junction of these batteries being grounded. The junction of phototransistors PT–1 and PT–2 is connected to output terminal 33. To avoid complexity in the drawings, details of the housing (which need not be light tight due to the high intensity beams available from the light sources), bearings and the like have been omitted.

The light from lamps 25 and 26 opposite phototransistors PT–1 and PT–2 is modulated by the interference pattern formed by the discs. The resulting output voltage waveform for D.-C. supply sources 31 and 32 is shown in FIG. *5a* as a function of rotation angle $\theta$, where the peak voltage is generally of the order of the voltage of one of the sources shown in FIG. 4. When each transistor receives an equal amount of light through the pattern, the voltage drop across each is the same, and the output voltage is, therefore, zero. As one or the other phototransistor receives more light due to the rotating pattern, the output voltage goes positive or negative accordingly.

By using matched transistors, the null voltage is highly stabilized. If the ambient temperature or the supply voltage changes, both transistors are in identical states; hence, the null voltage remains true, even though the voltage across or the current through the transistors changes.

The null voltage is also stable if one or both of the discs 11 and 16 are mounted slightly eccentric on the axis of rotation. This is an especially significant feature because centering errors rather than the accuracy of the photographic pattern has heretofore limited the precision of such angular measuring instruments. To illustrate this feature, assume that the discs are originally centered and that the output voltage is at null. In this condition, the phototransistors are receiving equal amounts of light and, hence, are observing a group of sectors in regions *b* and *c* of FIG. 3. If either or both discs are displaced from the center by small increments without rotation, it is seen that the total transparent area of the sectors in region *b* remains equal to the transparent area in region *c*. More particularly, if a disc is translated along the diameter connecting the phototransistors, the transparent areas affecting the phototransistors essentially maintain their size.

If the discs are translated in a direction perpendicular to the diameter connecting the phototransistors, the half-open sectors in regions *b* and *c* either both close or both open by the same amount. In any event, the total transparent area in both regions is affected identically. The two phototransistors receive varying, but nevertheless equal, amounts of light, thereby maintaining the null voltage.

Stabilization of eccentricities is effective until the half-open sectors reach the fully open or fully closed position. The null will still be ideally maintained in these positions, but when a disc is rotated, null output voltage modulation will not occur because the two modulated light signals are then in phase. As a practical matter, the limit to eccentricity compensation is that displacement which causes the half-open sectors to change by ±¼ of a sector at a radial distance where the light beam intercepts the disc. Still another advantage gained by using the cascode circuit is stability at higher rotational frequencies. When a single phototransistor is used in series with a load resistance, the average value of the waveform shifts off the null at higher frequencies. This shift is due to the rectifying action of minority carrier storage which causes the transistor to increase its current faster than it can decrease it. With the cascode circuit, this effect is diminished. In any event, it is symmetrical about the null, thereby maintaining the low frequency average value.

An A.-C. output signal may be obtained by employing phototransistors having a gain when the collector-emitter diode portion is forward biased. The gain under these conditions need not be equal to the gain when biased normally but is preferably matched to that of the other cascoded phototransistor when similarly biased. The output signal under these conditions is shown in FIG. *5b*. This output signal is similar to that derived from a synchro except that the modulation envelope is triangular rather than sinusoidal. Moreover, a cycle of the modulation envelope occurs N times per shaft revolution instead of only once.

Because of the large number of electrical periods per revolution, the inaccuracy of the signal waveform of FIG. *5b* in electrical degrees may be up to N times as great as that derived from a conventional synchro, yet still maintain a better angular accuracy than the synchro.

By placing other cascode pairs of phototransistors energized by respective light sources around the circumference of the pattern, other waveforms may be generated which are displaced in phase from each other. The electrical phase angle between such signals is identical to the geometrical angle between the diameters upon which respective pairs of phototransistors are located. For example, if a second pair of phototransistors is mounted diametrically perpendicular to the first pair, two waveforms 90° out of phase with each other are generated.

Referring to FIG. 6, there is shown such a multiphase arrangement wherein a second pair of phototransistors PT–3 and PT–4 is mounted diametrically perpendicular to the first pair of phototransistors PT–1 and PT–2. A lower disc 34 having a large number of equiangular alternating opaque and transparent sectors is mounted upon a rotating shaft 35 directly below a fixed disc 36 having one less opaque and one less transparent sector. In the particular orientation shown, the vectors 37 represent the magnitude of light transmitted through the transparent secor including the origin of the vector. It is seen that the sector transmitting maximum light intensity is spaced 180° from the sector transmitting a minimum of light.

Also note that the intensity of light transmitted through intermediate sectors is a linear function of the angular displacement of the sectors from the sector of minimum light transmission. Illuminating lights 25 and 26 direct light through discs 34 and 36 to phototransistors PT–1 and PT–2. Illuminating lights 41 and 42 serve a similar function with respect to phototransistors PT–3 and PT–4 in space quadrature with respect to the first mentioned pair of transistors.

Both pairs of transistors are cascode-connected as shown. The junction of the collector of phototransistor PT–1 and the emitter of phototransistor PT–2 is connected to output terminal 33. The junction of the collector of phototransistor PT–3 and the emitter of phototransistor PT–4 is connected to output terminal 43. The common connection of the emitters of phototransistors PT–1 and PT–3 is connected to voltage source 31. The common collector connection of phototransistors PT–2 and PT–4 is connected to voltage source 32. The junction of voltage sources 31 and 32 is grounded. In FIG. 6, as in FIG. 4, the system housing and bearing system has not been shown.

With reference to FIG. 7, there is shown a graphical representation as a function of electrical degrees $\theta$ of a waveform A provided at output terminal 33 and a waveform B, displaced from waveform A by 90 electrical degrees, provided at output terminal 43. By counting the polarity transitions of the two waveforms, a digital representation of the shaft angular position may be continuously provided. When waveform A switches to the same polarity as waveform B, a positive increment of angle is indicated. When waveform A switches to a polarity opposite that of waveform B, a negative increment is indicated. For transitions of waveform B, the converse is true. That is, if waveform B switches to a polarity like that of waveform A, a negative increment of angular position has occurred. If the transition is to a polarity opposite that of waveform A, a positive increment of angular displacement is indicated. For a rotating disc of N lines, a revolution may therefore be subdivided into 4N equal increments, one for each null crossing of each waveform.

With reference to FIG. 8, there is shown a logical block diagram of a counter for accumulating these increments. Slave flip-flop A and slave flip-flop B follow the polarities of waveforms A and B on terminals 33 and 43, respectively. D.-C. conditioning potentials, designated $A_1$ and $B_1$, are respectively provided by flip-flop A and flip-flop B when the associated input waveforms are then positive. Conditioning potentials $A_0$ and $B_0$ are respectively provided by flip-flops A and B from the complementary outputs when the associated input signal waveforms are negative. Positive pulse signals, designaeed $a_0$, $a_1$, $b_0$ and $b_1$ occur when their capital letter counterparts switch to positive. A forward-backward counter 44 stores a count which indicates the shaft position in digital form. This count is advanced whenever any one of the gates 45, 46, 47 or 48 delivers an output pulse to add line 51. The count is diminished whenever any of gates 52, 53, 54, or 55 deliver an output pulse to subtract line 56.

Gate 45 delivers an add pulse when waveform B is negative and waveform A is changing from positive to negative. Gate 46 delivers an add pulse when waveform B is positive and waveform A is changing from negative to positive. Gate 47 delivers an add pulse when waveform A is positive and waveform B is changing from positive to negative. Gate 48 delivers an add pulse when waveform A is negative and waveform B is changing from negative to positive.

Gate 52 delivers a subtract pulse when waveform B is positive and waveform A is changing from positive to negative. Gate 53 delivers a subtract pulse when waveform B is negative and waveform A is changing from negative to positive. Gate 54 delivers a subtract pulse when waveform A is negative and waveform B is changing from positive to negative. Gate 55 delivers a subtract pulse when waveform A is positive and waveform B is changing from negative to positive. Thus, the circuit of FIG. 8 carries out the logic discussed above for recording the sense of incremental changes in shaft position.

With reference to FIG. 9, there is shown a shaft follower servo system incorporating the invention. The apparatus of FIG. 4 is incorporated into the system wherein shaft 24 is connected to the armature of a D.-C. motor 61 driving an output shaft load 62. Armature current is drawn by armature winding 63 from the junction of phototransistors PT–1 and PT–2. Constant field current is drawn by field winding 64 from the serially-connected voltage sources 31 and 32.

Input shaft 23 drives disc 15 causing the light-dark pattern to rotate slightly and unbalance the voltage drop across the phototransistors. This in turn results in a positive or negative increase in armature current through armature windings 63 of D.-C. motor 61. The resulting torque will drive the output load 62 and disc 16 on shaft 24 until the balance is restored. It is to be noted that the input shaft 23 is completely isolated from the load 62.

The gear ratio is $N/N+1$, or nearly unity in this configuration where the input disc has N opaque sectors. To attain a gearing up of N, where N may be as much as several thousand, the system shown in FIG. 10 may be used.

With reference to FIG. 10, the arrangement there represented is like that in FIG. 9 except that disc 16 is held stationary while the light sources 25 and 26 and phototransistors PT–1 and PT–2 are supported within a rotatable assembly 16 attached to output shaft 24. Power is delivered to the light sources and phototransistors through slip rings 66 and 67 and armature current from the junction of the two phototransistors is supplied through slip ring 68. A constant field current is delivered to field winding 64 from terminal 71. To null the output voltage, the lamp-phototransistor assembly 65 is rotated, the load being coupled directly to this assembly. Thus, an exceptionally high gear ratio is obtained without the inertia, errors, wear and space requirements of a gear train. Numerous other gearing arrangements, such as differential gearing and gearing down may be realized by rotating and servoing various combinations of the two discs and the lamp-phototransistor assembly.

The phototransistors, though giving several volts output, are low power devices. To drive higher power loads, such as most motors, some power amplification is generally necessary. This may be accomplished by inserting an amplifier between the junction of the phototransistors and the load. With reference to FIG. 11, there is shown another method wherein each phototransistor is converted into a compound transistor by connecting the emitter and collector of a transistor to the base and collector, respectively, of a second transistor. A large power gain is accomplished by this and an even greater gain is possible if the compounded transistor is again compounded with a power transistor. When two compound phototransistors are used in the cascode circuit, all the advantages of null stability are still obtained. Thus, a phototransistor 72 is shown compounded with a second transistor 73 and a power transistor 74 for directly driving relatively high power loads.

Although the servo systems discussed above function well as long as the characteristics of the system are such that the output follows the input to within 180° of electrical waveform, in some systems it is possible that the output will lag or lead the input by integral multiples of 360 electrical degrees. As in conventional servo systems, under such conditions, the optically servoed system described above may stabilize about a false null value.

With reference to FIG. 12, there is shown a pair of discs having first and second tracks of sectors whereby coarse and fine error signals may be provided to overcome this difficulty. Disc 75 is shown with an inner annular ring having N opaque sectors and an outer annular ring 77 having KN opaque sectors, where K is some multiplying factor greater than unity. Disc 81 has an inner annular ring 82 with $N+1$ opaque sectors and an outer annular ring 83 with $K(N+1)$ opaque sectors. When the two discs are aligned on a common axis and each track scanned in the manner discussed above in connection with FIG. 4, the coarse signal is generated by relative motion between the inner annular rings of sectors which contain an integral submultiple of the number of sectors on the outer annular rings which are scanned to provide the fine signal.

The two signals are shown in FIG. 13 as a function of error, on a common axis. Note that a true null occurs when both coarse and fine signals pass through zero.

With reference to FIG. 14, there is shown a circuit arrangement for indicating this true null. As in the arrangement of FIG. 4, the oppositely phased fine-coarse signals 84 and 85 are sensed by phototransistors PT–1 and PT–2. An additional pair of phototransistors PT–5 and PT–6 are located radially inward from phototransistors PT–1 and PT–2 for sensing the oppositely phased coarse signals 86 and 87. The junction of transistors PT–5 and PT–6 is coupled to output terminal 33 by diodes D1 and D2. The diodes D1 and D2 are preferably silicon diodes having the characteristic indicated in FIG. 15.

When the signal is small, the coarse and fine signals have nearly the same value. In this state, even the forward biased diode is not conducting because the knee voltage shown in FIG. 15 has not been exceeded. Hence, output terminal 33 is effectively isolated from the coarse signal. The fine signal then has complete control when the error is small.

When the error is large enough such that the knee voltage of one of the diodes is exceeded, the coarse signal, being much larger than the fine signal, is applied to output terminal 33 to control correction. The coarse signal may be made much larger than the fine signal by appropriate choice of compounded transistors. A fine-coarse-very-fine-coarse system may be constructed by adding an additional track on both discs while retaining the integral submultiple relationship between the added tracks and others having more opaque sectors.

Unlike a conventional fine-coarse synchro system, gear trains are completely avoided with the fine-coarse optical synchro system discussed above. Moreover, only a single pair of discs is required for both fine and coarse signals.

With reference to FIG. 16, there is shown a system for electrically transmitting shaft positions whereby one or more two-phase optical synchros generally of the type shown in FIG. 6 may be slaved to an identical master optical synchro located at a remote point. The in-phase signal derived from terminal 33 (FIG. 6) is designated I and the quadrature signal derived from terminal 43 is designated Q. An input shaft 91 is associated with the master optical synchro 92 providing in-phase and quadrature signals $I_1$ and $Q_1$. A first motor 93, second motor 94, slave optical synchro 95 and load 96 are mechanically coupled by a common shaft 97. Slave optical synchro 95 provides an in-phase signal $I_2$ and a quadrature signal $Q_2$. The in-phase signals $I_1$ and $I_2$ are applied to opposite ends of armature winding 101 of motor 93 and to the same end of field winding 102, the other end of which is grounded. The quadrature signals $Q_1$ and $Q_2$ are applied to opposite ends of armature winding 103 of motor 94 and field winding 104 of motor 93, the other end being grounded. The slave optical synchro is rotated by the motors until its two outputs $I_2$ and $Q_2$ are equal to the master outputs $I_1$ and $Q_1$, respectively.

When $I_1=I_2$ and $Q_1=Q_2$, there is no error and hence no armature current flows through either motor. If $I_1-I_2$ is non-zero with the same polarity as $Q_2$, an arbitrarily positive correction torque is applied to the slave shaft 97 by motor 93. Should these polarities be opposed, the torque is then negative. In both cases, the torque is proportional to the difference error $I_1-I_2$ and to the value of $Q_2$.

As $Q_2$ approaches zero, this motor torque will become ineffective since its field will go proportionately to zero. As this occurs, however, $I_2$ increases proportionately in magnitude, thereby building up the field of motor 94. The torque correction of motor 94 operates such that a negative correction torque is applied if $Q_1-Q_2$ is the same polarity as $I_2$. Otherwise, the torque is positive. The net torque is proportional to the quantity $$(I_1-I_2)Q_2-(Q_1-Q_2)I_2$$

The net torque varies in direct proportion to the angular error, since the two armature currents are proportional to this error and the sum of the magnitudes of the two field currents is constant. Moreover, the nulls are stabilized, even when master and slave supply voltages differ.

An electromechanical transducer of great versatility has been described for converting rates and positions into electrical signals. The novel photoelectric system may also be used as a very accurate tachometer by counting crossovers of the photoelectrically derived output signals.

Numerous other uses and modifications of and departures from the specific apparatus described herein will now be apparent to those skilled in the art without departing from the inventive concepts. Consequently, the invention is to be construed as limited only by the spirit and scope of the appended claims.

What is claimed is:

1. Apparatus for providing an electrical signal characteristic of an angular parameter of a rotatable shaft comprising, a first circular disc mounted for rotation with said shaft, said first circular disc being axially symmetric about the axis of said shaft, a second circular disc axially symmetric about said axis adjacent to said first disc, said first and second discs having a different number of alternately opaque and translucent sectors, a first photoelectric transducer, a first light source directing light through both said discs to said first photoelectric transducer, a second photoelectric transducer, a second light source directing light through both said discs to said second photoelectric transducer, a third photoelectric transducer, a third light source directing light through both said discs to said third photoelectric transducer, a fourth photoelectric transducer, and a fourth light source directing light through both said discs to said fourth photoelectric transducer, the four light beams from said light sources being arranged in two pairs with the light beams in each pair interrupted at diametrically opposite points of said discs.

2. Apparatus in acordance with claim 1 wherein the four light beams from said light sources to said photoelectric transducers are generally parallel to and angularly spaced by substantially 90 degrees about said shaft axis.

3. Apparatus in accordance with claim 2 further including means for combining the electrical output signals derived from said four photoelectric transducers.

4. Apparatus for providing an electrical signal characteristic of an angular parameter of a rotatable shaft comprising, a first circular disc coupled for rotation with said shaft, said first disc disposed axially symmetric about the axis of said shaft, a second circular disc axially symmetric about said shaft axis adjacent to said first disc, said first and second discs having a different number of alternately opaque and translucent sectors, a first photoelectric transducer, a first light source directing light through both said discs to said first photoelectric transducer, a second photoelectric transducer, a second light source directing light through both said discs to said second photoelectric transducer, the light beams between said photoelectric transducers and said light sources being interrupted at diamertically opposite points of said discs, said first and second transducers being serially connected phototransistors, a D.-C. motor having an armature, armature winding and field winding, an output shaft secured to said armature and said second disc and having an axis coincident with said common axis, means for applying constant current to said field winding, and means for supplying current to said armature winding from the junction of said serially connected phototransistors whereby said output shaft follows the angular movement of said rotatable shaft.

5. Apparatus for providing an electrical signal characteristic of an angular parameter of a rotatable shaft comprising, a first circular disc coupled for rotation with said rotatable shaft, said first disc disposed axially symmetric about the axis of said rotatable shaft, a second circular disc axially symmetric about said shaft axis adjacent to said first disc, said first and second discs having a different number of alternately opaque and translucent sectors, four photoelectric transducers, four light sources, each light source directing light through both said discs to a different one of said photoelectric transducers, the four light beams from said light sources to said photoelectric transducers being angularly spaced by substantially 90 degrees about said axis with each light beam passing through both said discs, the first and second photoelectric transducers being serially connected phototransistors and the third and fourth photoelectric transducers being serially connected phototransistors, thereby providing first and second electrical signals in time quadrature at the junction of the first and second transistors and the junction of the third and fourth transistors respectively, and further comprising a forward-backward counter having add and subtract inputs for accepting count advancing and count retarding signals respectively, means responsive to a change in said first signal to the same polarity as said second signal and a change in said second signal from the same polarity as said first signal for delivering count advancing signals to said add input, and means responsive to a change in said first signal from the same polarity as said second signal and a change in said second signal to the same polarity as said first signal for delivering count retarding signals to said subtract input.

6. Apparatus in accordance with claim 5 wherein the means responsive to changes in polarity comprise first and second slave flip-flops energized by said first and second signals respectively each slave flip-flop providing first and second conditioning signals during mutually exclusive contiguous time intervals when the associated energized signal is of first and second polarities respectively, four pairs of gates conditioned by respective ones of said conditioning signals, one gate in each pair having its output coupled to said add input, the other gate in each pair having its output coupled to said subtract input, each gate being conditioned at a first input by one of said flip-flops and having a second input energized by a pulse for each change in the conditioning signal delivered by the other of said flip-flops.

7. Apparatus for electrically transmitting a shaft position comprising, a master optical synchro and a slave optical synchro; each optical synchro including a rotatable shaft having a first circular disc supported thereon axially symmetric about the axis of said shaft, a second circular disc axially symmetric about said shaft axis adjacent to said disc, said first and second discs having a different number of equiangular sectors which are alternately opaque and transmissive, sources providing four light beams generally parallel to and angularly spaced by 90 degree intervals about said shaft axis, said light beams being arranged to pass through both said discs, two pairs of serially connected phototransistors arranged to receive light energy transmitted through both said discs and provide first and second signals in electrical quadrature in response to the position of said shaft, said slave optical synchro having an additional shaft whereby the relative angular orientation of said additional shaft and the slave synchro rotatable shaft is indicated by said slave synchro first and second signals, first and second motors each having an armature, armature winding and field winding, both said armatures being secured to said additional shaft, means for applying said master optical synchro and said slave optical synchro first signals to opposite ends of said first motor winding and to the same end of said second motor field winding, and means for applying said second signals to opposite ends of said second motor armature winding and to the same end of said first motor field winding.

8. Apparatus for providing an electrical signal characteristic of an angular parameter of a rotatable shaft comprising, a first circular disc coupled to said shaft for rotation therewith, said first disc disposed axially symmetric about the axis of said shaft, a second circular disc axially symmetric about said shaft axis adjacent to said first disc, said first and second discs having a different number of sectors which are alternately opaque and translucent, a first photo electric transducer, a first light source directing light through both said discs to said first photoelectric transducer, a second photoelectric transducer, a second light source directing light through both said discs to said second photoelectric transducer, said photoelectric transducers being spaced by substantially 180 degrees about said shaft axis, the light beams between each light source and its respective photoelectric transducer being interrupted at diametrically opposite points of said discs; wherein said first and second photoelectric transducers are serially connected phototransistors, said second disc being fixed and further comprising a D.-C. motor having an armature, armature winding and field winding, a rotatable assembly concentrically arranged about said common axis and supporting said light sources and phototransistors, an output shaft secured to said rotatable assembly and said armature, means for applying constant current to said field winding, and means for supplying current to said armature winding from the junction of said serially connected phototransistors whereby said output shaft follows the angular movement of said rotatable shaft.

References Cited by the Examiner

UNITED STATES PATENTS 3,096,444 7/63 Seward.

JOHN F. COUCH, *Primary Examiner.*